US012290802B2

(12) United States Patent
Jacob et al.

(10) Patent No.: US 12,290,802 B2
(45) Date of Patent: May 6, 2025

(54) METHOD AND REACTOR FOR MANUFACTURING PARTICLES

(71) Applicant: Glatt Ingenieurtechnik GmbH, Weimar (DE)

(72) Inventors: Michael Jacob, Weimar (DE); Frank Ohlendorf, Erfurt (DE); Arne Teiwes, Weimar (DE)

(73) Assignee: Glatt Ingenieurtechnik GmbH, Weimar (DE)

( * ) Notice: Subject to any disclaimer, the term of this patent is extended or adjusted under 35 U.S.C. 154(b) by 1239 days.

(21) Appl. No.: 17/044,908

(22) PCT Filed: Mar. 27, 2019

(86) PCT No.: PCT/EP2019/057736
§ 371 (c)(1),
(2) Date: Oct. 2, 2020

(87) PCT Pub. No.: WO2019/192908
PCT Pub. Date: Oct. 10, 2019

(65) Prior Publication Data
US 2021/0146325 A1    May 20, 2021

(30) Foreign Application Priority Data
Apr. 5, 2018   (DE) .................. 10 2018 205 152.6

(51) Int. Cl.
*B01J 6/00*        (2006.01)
*B01J 4/00*        (2006.01)
(Continued)

(52) U.S. Cl.
CPC ................ *B01J 6/00* (2013.01); *B01J 4/002* (2013.01); *C01B 13/145* (2013.01); *F23C 15/00* (2013.01);
(Continued)

(58) Field of Classification Search
CPC ........ B01J 6/00; B01J 4/002; B01J 2204/002; B01J 2204/004; C01B 13/145; F23C 15/00; C01P 2004/64
(Continued)

(56) References Cited

U.S. PATENT DOCUMENTS 5,628,937 A    5/1997  Oliver et al.
6,464,737 B1  10/2002  Morimoto et al.
(Continued)

FOREIGN PATENT DOCUMENTS

DE            69306128 T2   3/1997
DE        102004038029 A1   4/2006
(Continued)

*Primary Examiner* — Anita Nassiri-Motlagh
(74) *Attorney, Agent, or Firm* — The Webb Law Firm

(57) ABSTRACT

A method for manufacturing particles including (a) bringing at least one starting material into a reactor, (b) subjecting the at least one starting material to a thermal treatment of a pulsating process gas stream in a treatment zone of the reactor, (c) forming particles, and (d) bringing the particles which are obtained in steps (b) and (c) out of the reactor. The at least one starting material is thermally treated in the treatment zone at a treatment temperature of 100° C. to 3000° C. and a retention time in the range of 0.1 s to 25 s, and a temperature regulation of the process gas stream is decoupled from the generation and maintenance of a pulsation of the process gas stream. Also provided is a reactor for manufacturing particles according to the method.

11 Claims, 6 Drawing Sheets

(51) Int. Cl.
  *C01B 13/14* (2006.01)
  *F23C 15/00* (2006.01)
(52) U.S. Cl.
  CPC .... *B01J 2204/002* (2013.01); *B01J 2204/005* (2013.01); *C01P 2004/64* (2013.01)
(58) Field of Classification Search
  USPC .................................................. 423/592.1
  See application file for complete search history.

(56) References Cited

U.S. PATENT DOCUMENTS

| | | | |
|---|---|---|---|
| 9,579,631 | B2 | 2/2017 | Wolk et al. |
| 9,869,512 | B1 * | 1/2018 | Gibbel .................... F26B 11/14 |
| 2008/0247931 | A1 * | 10/2008 | Domesle ................ C01G 51/42 |
| | | | 423/594.15 |
| 2009/0098027 | A1 | 4/2009 | Tabata et al. |
| 2014/0134068 | A1 | 5/2014 | Enomura |
| 2016/0313000 | A1 | 10/2016 | Buchner |
| 2017/0307211 | A1 | 10/2017 | Buchner |

FOREIGN PATENT DOCUMENTS

| | | |
|---|---|---|
| DE | 10109892 B4 | 5/2010 |
| DE | 10201505224 A1 | 10/2016 |
| DE | 102015006238 A1 | 11/2016 |
| DE | 102016002566 A1 | 9/2017 |
| DE | 102016004977 A1 | 10/2017 |
| EP | 2335821 B1 | 3/2016 |
| JP | H0724292 A | 1/1995 |

* cited by examiner

METHOD AND REACTOR FOR MANUFACTURING PARTICLES

CROSS-REFERENCE TO RELATED APPLICATIONS

This application is the United States national phase of International Application No. PCT/EP2019/057736 filed Mar. 27, 2019, and claims priority to German Patent Application No. 10 2018 205 152.6 filed Apr. 5, 2018, the disclosures of which are hereby incorporated by reference in their entirety.

BACKGROUND OF THE INVENTION

Field of the Invention

The invention relates to a method for manufacturing particles, preferably nano-particles, in particular nano-crystalline metal oxide particles, comprising the steps (a) bringing at least one starting material into a reactor, (b) subjecting the at least one starting material to a thermal treatment of a pulsating process gas stream in a treatment zone of the reactor, (c) forming particles, and (d) bringing the particles which are obtained in step (b) and (c) out of the reactor, wherein the at least one starting material is thermally treated in the treatment zone at a treatment temperature of 100° C. to 3000° C. and a retention time in the range of 0.1 s to 25 s.

Furthermore, the invention relates to a reactor for manufacturing particles, preferably nano-particles, particularly preferably nano-crystalline metal oxide particles, wherein the reactor (a) comprises an inlet for bringing at least one starting material into the reactor, (b) an inlet for a process gas which flows through the reactor, (c) a heating unit for heating the process gas which flows through the reactor to the treatment temperature, (d) a pulsation unit for the pressure modulation of the process gas which flows through the reactor, and (e) a separating unit for bringing the particles out of the reactor.

Description of Related Art

Methods and thermal reactors for manufacturing particles, in particular nano-crystalline metal oxide particles have already been known for more than 50 years and form the state of the art. The European patent EP 2 335 821 B1 discloses a thermal method for manufacturing nano-crystalline metal oxide particles comprising the steps a) bringing a starting compound into a reaction chamber by way of a carrier fluid, b) subjecting the starting compound to a thermal treatment of a pulsating stream in a treatment zone, c) forming nano-crystalline metal oxide particles, d) bringing the nano-crystalline powders which are obtained in step b) and c) out of the reactor, wherein the starting compound is introduced into the reaction chamber in the form of a solution, slurry, suspension or in a solid aggregate state and is thermally treated in the treatment zone at a temperature of 240° C. to 600° C. with a retention time in the range of 200 ms to 2 s.

The method according to the European patent EP 2 335 821 B1 is based on a self-excited periodically unsteady combustion within a predefined reactor geometry, which corresponds to a Helmholtz resonator, wherein the pulsation (vibration/oscillation) of the gas stream is generated by way of combustion instabilities. The pressure pulsation is hence a result of complex flow procedures in the individual part-assemblies of the thermal reactor, by which means a setting of the parameters of the pulsating flow independently of one another is not possible. Furthermore, with regard to the cited method, the manufactured nano-crystalline metal oxide particles are continuously contaminated on account of the direct production of the hot gas stream as a "flue gas" amid the application of direct burners or on account of an incomplete combustion of the combustion gas.

The German patent application DE 10 2015 005 224 A1 discloses a method for the precisely targeted setting or post-regulation of the amplitudes of the oscillations of the static pressure and/or of the hot gas speed in an oscillation fire facility with or without a thermal material treatment/material synthesis, said facility comprising at least one burner with which an oscillating (pulsating) flame is produced, and at least one combustion space (resonator) into which the flame is directed. Usually, a targeted, independent setting of the amplitude (oscillation magnitude) of the pulsating hot gas stream which results from a self-excited, fed-back combustion instability, in a pulsed combustion or a pulsation reactor and hence also an adaptation of the periodically unsteady combustion process to the selected throughput of the reactor (given a material treatment/material synthesis: e.g. the educt feed rate or the product rate) without a simultaneous, but undesired change of other process parameters (treatment temperature, retention time or treatment duration) and hence of the produced material characteristics is not possible. However, despite this, in order to render this possible, it is suggested to add an oscillation volume through which air, fuel or fuel-air mixture flows, into the supply conduits of the burner which run to the burner, upstream of the burner exit. Preferably, its size can be steplessly adjustable. Herewith, it is possible to change the amplitude of the oscillation.

The German patent application DE 10 2015 006 238 A1 discloses a method and a unit for the thermal material treatment or material conversion, in particular of course, granular raw materials in a pulsating hot gas stream with a frequency and amplitude of the speed oscillation or of the static pressure oscillation of the hot gas stream in a vertically arranged reaction space, which can be set independently of one another. Raw material particles which are introduced at the upper end of the vertically arranged reaction space cannot be transported pneumatically from the hot gas stream due to their shape, mass and density given a set average flow speed of the hot gas stream, but sink downwards counter to the flow direction. The thermal treatment of the material into the desired product is effected during this sinking time of approx. 1 s to 10 s, said product being taken out of the reactor at the lower end of the reaction pipe with the help of a lock system. The German patent application DE 10 2016 004 977 A1 relates to a unit and to a method for the thermal treatment of a raw material in an oscillating hot gas stream of a pulsed combustion reactor, with a burner, to which a mass flow is fed via at least one conduit for forming at least one flame which produces the oscillating hot gas stream, wherein the flame is arranged in a combustion chamber and wherein a reaction space connects to the combustion chamber downstream. In order to be independent of the dimensions of the unit, it is suggested to provide the mass flow which is fed to the flame with an externally modulated pulsation. The combustion chamber and/or the reaction space can then be changeable in geometry for avoiding resonances.

A method and a unit for the thermal treatment of a raw material, with a combustion chamber in which a periodically unsteady oscillating flame burns, for producing a pulsating exhaust gas stream which flows through a reaction space which connects onto the combustion chamber is disclosed in the German patent application DE 10 2016 002 566 A1. In order to succeed in the raw material being effectively treated, it is suggested to provide an insert in the reaction space, wherein the exhaust gas stream flows through the insert and the insert is reduced in cross-sectional area compared to the reaction space and has a length which is shorter than a total length of the reaction space. In particular, the length of the insert and the geometry of the combustion chamber can be changed, so that the unit comprises two resonators which can be matched to one another.

SUMMARY

The disadvantage of the methods and units which have been disclosed in the aforementioned German patent applications is the fact that the parameters of technical relevance to the method, such as treatment temperature, gas speed, pulsation frequency etc. cannot be set independently of one another. Furthermore, the manufactured particles, in particular the manufactured nano-crystalline particles are contaminated due to the direct production of the hot gas stream as a "flue gas" amid the application of direct burners or on account of the incomplete combustion of the combustion gas, for example natural gas. Contaminations also result from the use of the combustion gas itself. A deoxidising operation is only possible to achieve by way of much effort.

It is therefore the object of the invention to provide a method as well as a reactor for manufacturing particles, preferably nano-particles, in particle nano-crystalline metal oxide particles, wherein a setting of the technical parameters which are relevant to the method, such as treatment temperature, gas speed, pulsation frequency etc. can be effected independently of one another and hence the disadvantages of the state of the art are at least partly overcome.

Given a method of the initially mentioned type, this object is achieved by way of a temperature regulation of the process gas stream being decoupled from the generation and maintenance of a pulsation of the process gas stream. Hereby, what is meant by decoupling is that the energy for heating the process gas stream is provided by a heating unit and the energy for generating and maintaining the pulsation of the process gas stream is provided by a pulsation unit. Possible interactions between the heating unit and the pulsation unit are herein negligible. Furthermore, there is the possibility of a setting of the technical parameters which are of relevance to the method, such as treatment temperature, gas speed, pulsation frequency etc., at least to the greater part independently of one another. In a preferred embodiment, the heating and pulsation unit are spatially separated from one another. The pulsation unit ensures the pressure-side amplitude and frequency modulation for the gaseous energy carrier, the process gas. The pulsation unit therefore modulates a pressure pulsation onto the process gas, preferably with a pressure amplitude of 1 mbar to 350 mbar, particularly preferably from 1 mbar to 200 mbar, very particularly preferably from 3 mbar to 50 mbar, most preferably from 3 mbar to 25 mbar. The heating unit ensures that the gaseous energy carrier—the hot process gas which pulsatingly flows through the reactor—is temperature regulated in dependence on the energy quantities which are necessary for the treatment temperature. The respective unit, here the heating unit or pulsation unit therefore provides the greatest share of the energy, which is necessary for their respective function, specifically heating the process gas or generating and maintaining the pulsation of the process gas.

On account of the decoupling, the use of the most different of heating concepts is possible for heating the process gas. Hence the gaseous energy carrier, which is required for the thermal processes, the process gas, is provided in dependence on the required gas quantity and the required gas quality.

There exists the possibility of a batch-wise or a continuous process control.

Preferably, the particles which are thermally treated in the reactor are subjected to at least one post-treatment step, particularly preferably for example to a suspending, grinding or calcination. By way of this, a further improvement of the characteristics of the produced particles is effected. Advantageously, the illustrated method concept permits the operation of the method according to the invention with any arbitrary gas or gas mixture as a process gas. Preferably, the gases which are applied as a process gas are suitable for example for the deoxidising operation or as an explosion protection gas. In a particularly preferred embodiment, the process gas is an inert gas, i.e. the process gas does not take part in the reaction which takes place in the reactor for manufacturing the particles, but serves for providing and for the transfer of the thermal energy as well as a transport gas for the particles. What is very advantageous with the aforementioned design of the method according to the invention is further the fact that the method, apart from the "classical" inorganic substances or substance systems is also suitable for organic and/or combustible substances or substance systems.

Furthermore, a combustion gas is not necessary for carrying out the method according to the invention. The method according to the invention hence permits a contamination-minimised manufacture of particles up to the contamination-free manufacture of particles. Due to the minimising or avoidance of contaminations on manufacturing the particles, preferably nano-particles, particularly preferably nano-crystalline metal oxide particles, according to the method according to the invention there is provided the possibility of producing or manufacturing highly pure particles or materials. Furthermore, due to the possibility of forgoing a combustion gas, a simplified facility and safety concept is sufficient for the method according to the invention, since for example no flame monitoring needs to be set up. There is the possibility of adapting the manufacturing process such that the method according to the invention is suitable for pharmaceutical manufacturing processes and manufacturing processes in the foodstuff industry.

A further advantage of the method according to the invention is the fact that the pulsation can be set in a direct manner, since this is not a result of combustion instabilities such as for example flame oscillations or the like, or the pulsed feeding of fuel gas, combustion air or fuel gas/air mixtures. Due to the direct setting ability of operating parameters which are important to the method according to the invention, such as oscillation amplitude, pulsation frequency or the like, it is possible to optimally adapt the manufacturing method to the product to be manufactured, specifically the particles, preferably nanoparticles, in particular nano-crystalline metal oxide particles.

Furthermore, it has been found that in comparison to the methods according to the state of the art, significantly lower treatment temperatures (process temperatures) are possible in the treatment zone of the reactor. This is based on the fact that the temperatures can be set independently of a combustion reaction, for example by way of indirect heating of the process gas stream. The treatment temperatures with the method according to the invention lie between 100° C. and 3000° C. with retention times of 0.1 s to 25 s, preferably however between 650° and 2200° C., particularly preferably between 700° C. and 1800° C., each with retention times of 0.1 s to 25 s. An admixing of e.g. air to the flue gas for adapting the treatment temperature is not necessary. Preferably, the at least one starting material is fed into a process space of the reactor. The starting materials can also be fed into the reactor in the form of at least one starting compound. The at least one starting material can advantageously be brought into the reactor, preferably into the process space of the reactor in the form of a solution, suspension, slurry, a moist powder, a moist powder mixture or in the solid aggregate state. In a very preferred embodiment of the method according to the invention, the at least one starting material is brought into the reactor, in particular into the process space of the reactor in or counter to the flow direction of the pulsatingly flowing process gas. By way of this, there is given the possibility of also being able to thermally treat substances which cannot be transported in the reactor by the process gas.

A further advantage of the method according to the invention is the fact that the process gas which flows through the reactor in a pulsating manner is indirectly heated or heatable. By way of the indirect heating of the process gas, for example by way of a convective heater, a heating unit designed as an electric gas heater, as a plasma heating, as a microwave heating, as an induction heating, as a radiation heater or as an indirect burner, the applied process gas which is fed to the reactor can be brought up to the treatment temperature of 100° C. to 3000° C., preferably between 650° C. and 2200° C., particularly preferably between 700° C. and 1800° C., which is necessary for the formation of particles or material treatment. A combination of different heating methods is conceivable in any form. This type of heating has the advantage that the process gas does not experience any contamination due to the combustion process by way of a direct burner, for example by way of the flue gas which arises on combustion or by way of an incomplete combustion in a combustion chamber or the combustion gas itself. Preferably, the process gas which pulsatingly flows through the reactor is heated or warmed to the treatment temperature upstream of the pulsation unit, i.e. locally in front of the pulsation unit. Such an arrangement of the heating unit upstream of the pulsation unit is advantageous since in the case of a pulsating flow of the process gas, a subsequently arranged heating or warming can led to an influencing of the flow (damping or magnification of the pulsation).

Furthermore, it was ascertained that it is advantageous if the at least one starting material is thermally treated in the treatment zone at a treatment temperature of 100° C. to 3000° C. with a retention time of 2.5 s to 25 s. On account of a longer retention time in the reactor, the material systems are subjected to the treatment temperature for a longer period of time, by which means the material treatment can be completed without the substance or the substance system having to undergo for example a thermal post-treatment.

Preferably, the method according to the invention is carried out, wherein the process gas pulsates at a frequency of 1 Hz to 2000 Hz, preferably at 1 Hz to 500 Hz. Advantageously, by way of this, one succeeds in achieving high degrees of turbulence in the process gas which flows through the reactor due to the possibility of setting in a wide frequency range, by which means very small particles down to the nano-scale region can be produced, such being able to be adapted precisely to the particles to be treated and manufactured. By way of increasing the degree of turbulence, the material transfer and thermal transfer in the reactor between the process gas and at least one starting material which is to be thermally treated is significantly improved.

Furthermore, a pressure pulsation is modulated onto the process gas which flows through the reactor. The modulation is effected by way of the pulsation unit. The pressure pulsation preferably has a pressure amplitude of 1 mbar to 350 mbar, particularly preferably of 1 mbar to 200 mbar, very particularly preferably of 3 mbar to 50 mbar, most preferred of 3 mbar to 25 mbar. By way of the modulated pressure pulsation with a defined pressure amplitude, it is possible to optimally set the process conditions which are necessary for the particles to be manufactured.

The method according to the invention likewise preferably operates at a negative pressure compared to the ambient pressure. By way of a negative pressure which is produced in the reactor, for example by way of a fan at the reactor outlet, it is ensured that no particles or no material exits out of the reactor during the manufacturing process. A more reliable and safe operation of the facility is achieved and ensured by way of this.

A method according to one of the preceding paragraphs, wherein the reactor which is used for the method is a reactor according to one of the embodiments described herein.

Concerning a reactor of the initially mentioned type, this object is achieved by way of the heating unit and the pulsation unit being spatially separated from one another. The reactor is preferably designed as a synthesis reactor. What is meant by the term of thermal synthesis is the course of a thermal powder synthesis or particle treatment. By way of the separation and hence the decoupling, there exists the possibility of carrying out a setting of the parameters which are of technical relevance to the method, such as treatment temperature, gas speed, pulsation frequency etc., at least for the greater part independently of one another. The heating unit provides the greater part of the energy in the reactor which is necessary for heating the process gas, and the pulsation unit the greater part of the energy which is necessary for the generation and maintenance of the pulsation of the process gas. On account of the spatial separation or decoupling of the heating and pulsation unit, the use of the most varied of heating concepts is possible for heating the process gas, compared to the methods according to the state of the art. Furthermore, the reactor preferably comprises a process space. The process space preferably encompasses the complete treatment zone, i.e. the region of the reactor in which the manufacture or the thermal treatment of the particles takes place. Furthermore, the reactor comprises at least one installation part which is particular is designed as a flow necking or as a throttle, in particular as a pressure-resistant throttle. The at least one installation part is installed into the reactor particularly preferably before or after the process space. By way of this, the at least one installation part restricts the pressure pulsation to the process space, in particular the treatment zone. It is therefore essentially only the reactor part which is necessary for forming or treating the particles which is subjected to the pressure pulsation, by which means the number of equipment and apparatus which are subjected to an increased loading due to pressure pulsation is minimised.

Advantageously, the heating unit is designed as a unit for the indirect heating of the process gas which flows through the reactor. Preferably, the heating unit is designed as a convective gas heater, as an electric gas heater, as a plasma heating, as a microwave heating, as an induction heating or a radiation heater. The heating unit is very particularly preferably arranged upstream of the pulsation unit. By way of the indirect heating, it is possible to heat the process gas stream to the treatment temperature which is necessary for the occurrence of the particles or for the material treatment, of 100° C. to 3000° C., preferably between 650° C. and 2200° C., particularly preferably between 700° C. and 1800° C. By way of an indirect heating, the heating of the process gas is effected in a combustion chamber without a contamination by the combustion process due to a direct burner, for example due to the flue gas arising by the combustion, or by way of an incomplete combustion. Preferably, the process gas which pulsatingly flows through the reactor is heated or warmed to the treatment temperature upstream of the pulsation unit, i.e. locally in front of the pulsation unit, which is advantageous alone due to the fact that in the case of a pulsating flow of the process gas, a subsequent heating or warming can lead to a damping or an influence on the flow profile. Hence a compatibility for the pharmaceutical and foodstuff industry is achieved.

The reactor, in particular the process space of the reactor comprises a solid matter outlet which is preferably designed as a double flap, a rotary feeder, as a double flap batching valve or as an injector. Preferably, the solid matter outlet is used for bringing out the particles which are manufactured or treated in the treatment zone of the reactor, in the case that the particles due to their shape, mass and density cannot be transported by the process gas stream given the set average flow speed of this. Particularly preferably, on manufacturing the particles of this type, the treatment zone of the reactor, in particular therefore the process space, should be arranged vertically, so that the manufactured or treated particles drop downwards counter to the flow direction in the direction of the solid matter outlet which is preferably arranged in the lower region of the reactor, in particular of the process space. The thermal treatment of the particles which are brought into the reactor is hence effected during the sinking of the particles in the direction of the solid matter outlet. The produced particles are taken from the reactor at the solid matter outlet, e.g. via a lock system.

Furthermore, the reactor when necessary comprises a further heating unit for heating the process space of the reactor which in particular is designed as a trace heating, as a radiation heating, as a microwave heating, as an induction heating, as a radiation heater or as a burner. It is possible to heat the process space of the reactor in a direct or indirect manner by way of the further heating unit, so that the treatment temperature for producing or for the thermal treatment of the particles can be adapted and/or readjusted. By way of this, an optimal treatment temperature in the treatment zone of the reactor, in particular in the process space of the reactor is ensured.

Preferably, the pulsation unit is designed as a compression module, in particular as a piston, as a rotary slide valve, as a rotary flap or as a modified feed valve. Hereby, the drive of the feed valve is continuous and variable in speed. The presence of a pulsation unit which effects a pressure pulsation of the process gas or modulates a pulsation onto the process gas, wherein the pressure pulsation is not a result of complex flow procedures in part-assembles such as for example the combustion chamber, has the advantage of being able to have parameters or setting variables of technical relevance to the method which are independent of one another, such as amplitude, frequency, gas speed or the like and being able to set arbitrary combinations. The generation of particular oscillation shapes, such as for example sinusoidal, rectangular, triangular or saw-toothed is possible by way of a pulsation unit designed in such a manner.

Preferably, the reactor comprises at least one feed unit as an inlet for bringing in the at least one starting material.

Particularly preferably, the feed unit is designed as a single-substance and/or multi-substance nozzle, as a feed pipe and/or as a powder injector. On account of the feed unit, there exists the possibility of always feeding the at least one starting material to the reactor in its optimally processed form, for example as a solution, suspension, slurry, molten mass, emulsion or as a solid material.

Furthermore, the reactor preferably comprises a quenching unit. A rapid ending of a progressing reaction is effected by way of the quenching unit, via which preferably a cooling gas, such as for example air or cold air is fed to the reactor. Hereby, a water injection or the like is conceivable as an alternative. Other gases such as e.g. nitrogen ($N_2$), argon (Ar), other inert or noble gases or the like can likewise be applied as a cooling gas. Powder or another fine-particle solid matters which are formed in the process space or are treated there can be brought out of the reactor by the process gas stream and can then be separated by way of a separating unit. For this, one can use the most varied of particulate collection principles, possibly also a multi-stage separating unit. In particular, the separating unit is designed as a cyclone, as a filter, in particular as a hot gas filter, preferably as a bag filter or glass fibre filter, or as a wet scrubber. On account of the separating unit, there exists the possibility of bringing the produced or thermally treated particles, preferably nanoparticles, particularly preferably nano-crystalline metal oxide particles out of the reactor and subsequently possibly processing them further.

Furthermore, mobile designs of the reactor according to the invention can be realised in a simple manner.

BRIEF DESCRIPTION OF THE DRAWINGS

The invention is hereinafter explained in more detail by way of the accompanying drawings. In these are shown in.

DETAILED DESCRIPTION

Figure 1:
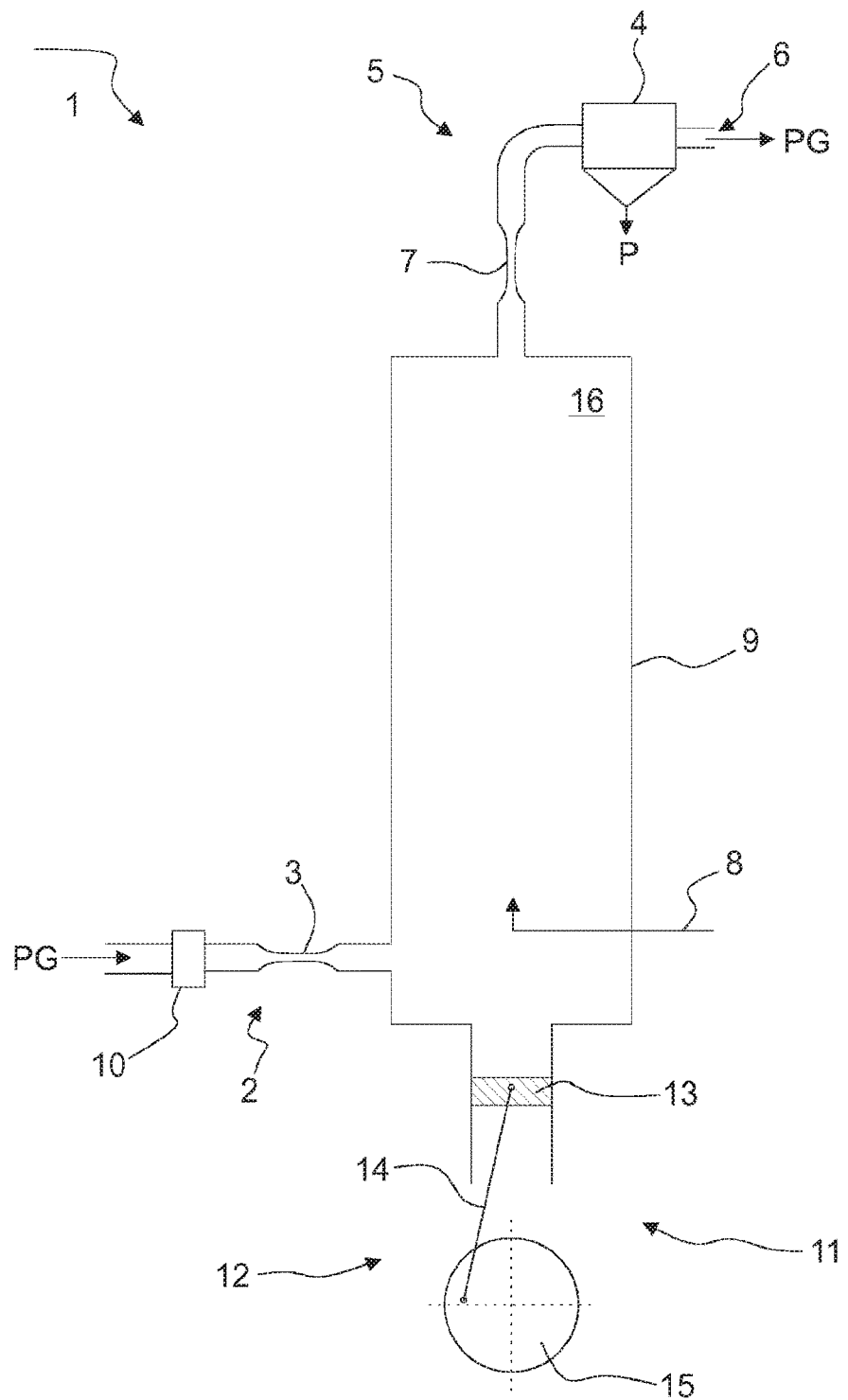
FIG. 1 a schematic representation of a first embodiment of a reactor according to the invention, FIG. 2 a schematic representation of a second embodiment of a reactor according to the invention, FIG. 3 a schematic representation of a third embodiment of a reactor according to the invention, FIG. 4 a schematic representation of a fourth embodiment of a reactor according to the invention, FIG. 5 a detailed schematic representation of a fifth embodiment of a reactor according to the invention and FIG. 6 a detailed schematic representation of a sixth embodiment of the reactor according to the invention.

A schematic representation of a first embodiment of the reactor 1 according to the invention for manufacturing organic or inorganic particles (P), preferably organic or inorganic nanoparticles, in particular nano-crystalline metal oxide particles, is shown in FIG. 1. The reactor 1 comprises an inlet 2 for process gas 2 which predominantly flows through the reactor 1. Further inlets for the admixing of further equal or different process gases, for example for the synthesis or treatment are likewise conceivable. An arbitrary gas or an arbitrary gas mixture can be used as a process gas. The term process gas herein encompasses an arbitrary gas as well as an arbitrary gas mixture. The process gas (PG) is preferably air, an arbitrary gas which is required for synthesis, an inert gas, an explosion protection gas or a gas which is suitable for deoxidising operation. The inlet 2 is preferably designed for example as a pipe or a pipe spout. The inlet 2 comprises an installation part 3. Preferably, the installation part 3 is designed for example in the form of a necking of the inlet 2 which is designed as a pipe or pipe spout or in the form of a throttle, preferably a pressure-resistant throttle.

Furthermore, the reactor 1 comprises an outlet 5 which comprises a separating unit 4. The outlet 5 is preferably designed as a pipe or pipe spout. The separating unit 4 is preferably designed as a filter, particularly preferably as a hot gas filter, for example as a bag filter or as a pocket filter, as an electric separator or as a cyclone. The separating unit 4 separates the manufactured or treated particles, preferably nanoparticles, particularly preferably nano-crystalline metal oxide particles, out of the process gas which exists out of the reactor 1 and the thermally treated particles are subsequently possibly subjected to further treatment steps, such as for example a grinding or a calcination. The separating unit 4 can be selected in accordance with the manufacturing process and the separating conditions, i.e. hot gas separation, dry separation, or wet separation. The process gas which is purified of the particles leaves the reactor via the outlet opening 6.

In the first embodiment of the reactor 1 which is shown in FIG. 1, an installation part 7 is arranged upstream of the separating unit 4 in the outlet 5 of the reactor 1. The installation part 7 is preferably designed in the form of a necking of the outlet 5 which is designed as a pipe or pipe spout or in the form of a throttle, preferably a pressure-resistant throttle.

The process gas (PG) flows via the inlet 2 into the reactor 1 and leaves this via the outlet 5. The flow direction of the process gas (PG) is therefore from the inlet 2 of the reactor 1 to the outlet of the reactor 1.

Furthermore, the reactor 1 comprises an inlet 8. The at least one starting material (AGS) is brought into the reactor 1 via the inlet 8. The inlet 8 is preferably designed in the form of a nozzle, in particular a spray nozzle, a pipe opening, a double flap, a rotary feeder, a double flap batching valve or in the form of an injector. The at least one starting material (AGS) can be brought into the reactor 1 for example in the form of a solution, suspension, slurry, as a moist powder or moist powder mixture or as a solid material, preferably whilst using a carrier gas. In this embodiment of the reactor 1 according to the invention and according to FIG. 1, the at least one starting material (AGS) is brought into the reactor 1 in the flow direction of the process gas. However, it is conceivable to bring the at least one starting material into the reactor 1 counter to the flow direction of the process gas. The decision as to whether the at least one starting material (AGS) is brought into the reactor 1 in or counter to the flow direction of the process gas depends predominantly on the shape, mass and/or density of the at least one starting material given a set average flow speed of the process gas.

The at least one starting material (AGS) which is brought into the reactor 1 via the inlet 8 is thermally treated in a treatment zone of the reactor 1. The treatment zone is preferably restricted to a process space 9 of the reactor 1. In a first embodiment of the reactor 1 according to FIG. 1, for example the installation parts 3, 7 serve for restricting the process space 9. A pressure pulsation of the process gas which flows through the reactor 1 is restricted to the process space 9 on account of the installation parts 3, 7.

Furthermore, the reactor 1 according to the invention comprises a heating unit 10. The heating unit 10 warms or heats the process gas which flows through the reactor 1, to such an extent that a desired treatment temperature is reached. The heating unit 10 in the first embodiment of the reactor 1 according to the invention is arranged upstream of the installation part 3 which is arranged in the inlet 2. The heating unit 10 preferably heats or warms the process gas which flows through the reactor 1 to a treatment temperature of 100° C. to 3000° C., The transfer of thermal energy onto the process gas which flows through the reactor 1 can be effected from the heating unit 10 in a direct or indirect manner.

Preferably, convective heaters, electric gas heaters, plasma beatings, microwave heating, induction heating or radiation heaters can be applied as a heating unit 10.

The reactor 1 furthermore comprises a pulsation unit 11 for the pressure modulation of the process gas (PG) which flows through the reactor 1. By way of the pulsation unit 11, a pulsation is imparted onto the process gas which flows through the reactor 1. The pressure pulsation preferably has a pressure amplitude of 1 mbar to 350 mbar, particularly preferably of 1 mbar to 200 mbar, very particularly preferably of 3 mbar to 50 mbar, most preferably 3 mbar to 25 mbar. A pulsating hot gas stream flows through the reactor 1 on account of the heating unit 10 and pulsation unit 11. The oscillation frequency of the process gas can be set independently of the pressure amplitude. In FIG. 1 the pulsation unit 11 is designed as a compression module 12. The compression module 12 comprises a piston 13, a conrod 14 and a crankshaft 15. The crankshaft 15 is rotated for example in the clockwise direction by way of a speed adjustable drive unit which is not shown, by which means the conrod 14 which is arranged between the piston 13 and the crankshaft 15 moves the piston 13 between a lower and an upper dead point, so that a volume 16 of the reactor enlarges or reduces in size. A pulsating flow of the process gas is produced by way of this. The oscillation frequency of the process gas which flows through the reactor 1 in a pulsating manner on account of the pulsation unit 11 can likewise be set, preferably in the frequency range of 1 Hz to 2000 Hz, particularly preferably in the frequency range from 1 Hz to 500 Hz. The required energy is fed via the flow and the treatment/retention time is defined by the interaction with the volume 16 of the reactor 1 (reactor volume, reactor length, reactor size), in particular of the process space 9 of the reactor 1. The retention time of the at least one starting material which is brought into the reactor 1, in particular into the process space of the reactor 1, in the treatment zone of the reactor 1 is between 0.1 s and 25 s.

Figure 2:
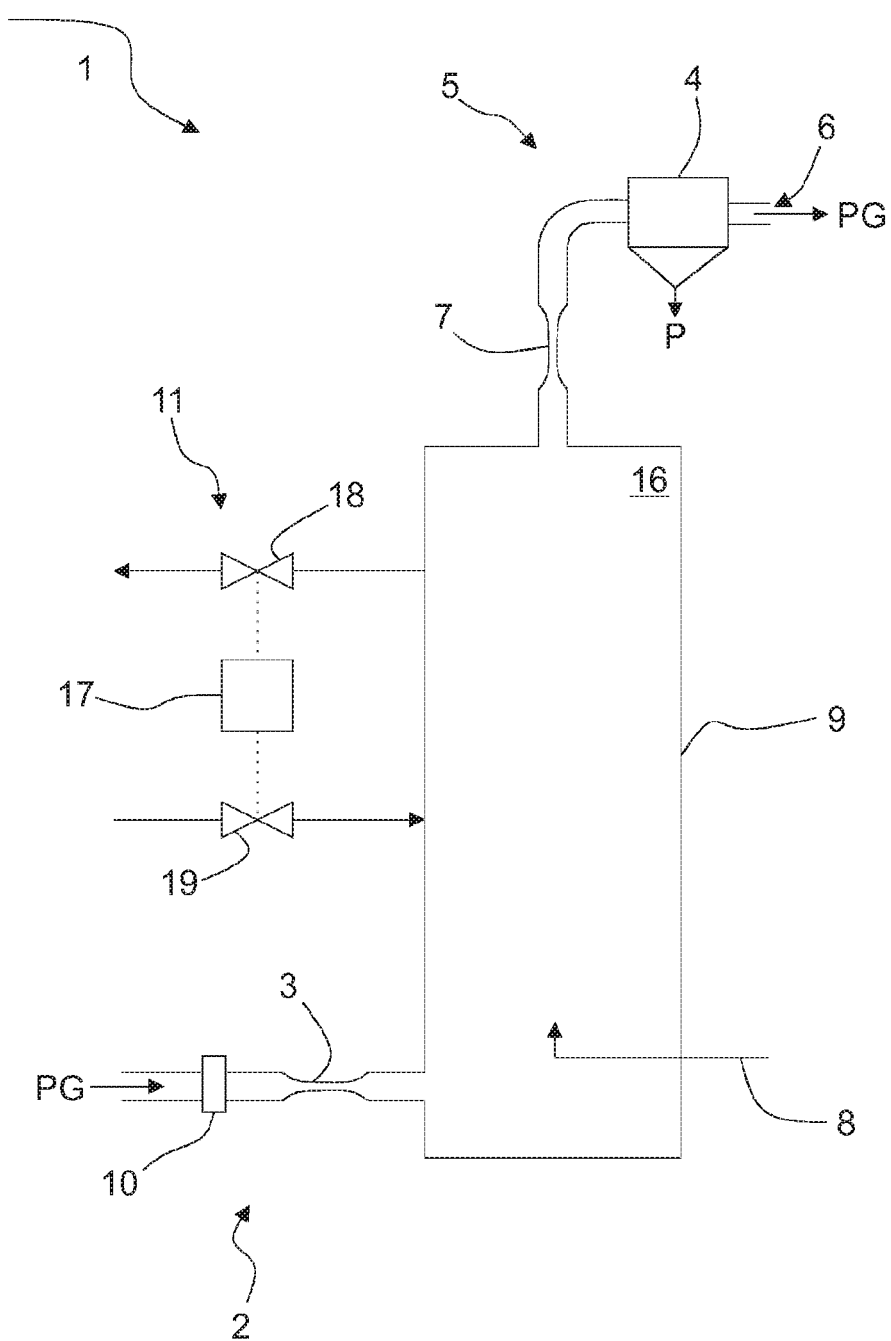

FIG. 2 shows a schematic representation of a second embodiment of a reactor 1 according to the invention, for manufacturing particles (P), preferably nanoparticles, particularly preferably nano-crystalline metal oxide particles. The reactor 1 comprises an inlet 2 for a process gas which flows through the reactor 1. The process gas (PG) is a gas or gas mixture, preferably air, an arbitrary gas which is required for synthesis, an inert gas, an explosion protection gas, or a gas which is suitable for deoxidising operation. The inlet 2 is preferably designed as a pipe or pipe spout and comprises an installation part 3.

Preferably, the installation part 3 is designed for example in the form of a necking of the inlet 2 which is designed as a pipe or pipe spout or in the form of a throttle, preferably a pressure-resistant throttle.

The heating unit 10 for warming or heating the process gas which flows through the reactor 1 is arranged upstream of the installation part 3 which is arranged in the inlet 2. The heating unit 1 preferably warms or heats the process gas which flows through the reactor 1 to a treatment temperature of 100° C. to 3000° C. The transfer of thermal energy onto the process gas which flows through the reactor 1 can be effected by the heating unit 10 in a direct or indirect manner. Preferably, the transfer of thermal energy is effected in an indirect manner in the method according to the invention. The heating unit 10 can also be designed for example as a direct burner, i.e. a direct contact exists between the process gas and a burner flame. Furthermore, the heating unit 10 can be designed as an indirect heating unit, for example in the form of an electric gas heater, a plasma heating, a microwave heating, an induction heating, a radiation heater, an arbitrary convective heater or an indirect burner. The reactor 1 furthermore comprises a process space 9 which connects to the inlet 2 downstream.

Furthermore, the reactor 1 comprises an outlet 5. The outlet 5 in the second embodiment of the reactor 1 according to the invention comprises an installation part 7 as well as a separating unit 4. In the second embodiment of the reactor 1, the installation part 7 is arranged in the outlet 5 upstream of the separating unit 4. The installation part 7 is designed as a necking of the pipe or pipe spout. However, the installation part 7 can also be designed as a throttle, preferably as a pressure-resistant throttle. The separating unit 4 separates the particles which are manufactured or treated in the reactor 1, from the process gas stream, so that the manufactured or treated particles can be removed from the separating unit 4 and the process gas which is not or only partly loaded with particles flows into the atmosphere via the outlet opening 6 of the outlet 5. The process gas which is not loaded can be led back to the inlet 2 if required.

The installation part 3 which is arranged in the inlet 2 and the installation part 7 which is arranged in the outlet 5 restrict a pressure pulsation of the process gas which flows through the reactor 1 to the process space 9 of the reactor 1.

The at least one starting material (AGS) is fed to the reactor 1, in particular to the process space of the reactor 1, via an inlet 8, so that the at least one starting material can be thermally treated in a treatment zone of the reactor 1. The treatment zone is preferably restricted to a process space 9 of the reactor 1. Preferably, the inlet 7 for bringing the at least one starting material (AGS) comprises at least one feed unit which is particularly preferably designed in the form of a single-substance and/or multi-substance nozzle and/or in the form of at least one powder injector. By way of the feed unit, there is the possibility of always feeding the at least one starting material to the reactor in its optimally processed form, for example as a solution, suspension, slurry or as a solid material. In the second embodiment of the reactor 1, the at least one starting material (AGS) is fed in the flow direction of the process gas.

Furthermore, the reactor 1 comprises a pulsation unit 11 for the pressure modulation of the process gas which flows through the reactor 1. A pulsation is modulated onto the process gas which flows through the reactor 1, by way of the pulsation unit 111. The pressure pulsation preferably has a pressure amplitude of 1 mbar to 350 mbar, particularly preferably of 1 mbar to 200 mbar, very particularly preferably of 3 mbar to 50 mbar, most preferably of 3 mbar to 25 mbar. On account of heating unit 10 and pulsation unit 11, a pulsating hot gas stream flows through the reactor 1. The oscillation frequency of the process gas can be set independently of the pressure amplitude. In FIG. 2, the pulsation unit 11 is realised by way of two valves 18, 19 being controlled by way of a control unit 17, said valves via a feed or discharge of process gas relieving or compressing the volume 16 which is contained in the reactor 1, in particular in the process space of the reactor 1. A relief, thus the process gas discharge out of the reactor 1 is also possible via the outlet 5, so that the pressure pulsation is effected exclusively via a closed loop controlled or generally controlled valve 19. Advantageously, by way of this, a loss of product via the process gas discharge via the valve 18 is prevented. With the compression procedure, the valve 19 is opened by the control unit 17 and the valve 18 is closed, so that process gas can flow into the reactor 1. By way of this, the pressure in the reactor 1 increases. With the relieving procedure, the valve 18 is opened by the control unit 17 and the valve 19 is simultaneously closed, by which means the pressure in the reactor 1 drops. By way of this, a pressure pulsation is imparted to the process gas which flows through the reactor 1. The oscillation frequency of the process gas which flows through the reactor 1 in a pulsating manner on account of the pulsation unit 11 can likewise be set, preferably in the frequency range of 1 Hz to 2000 Hz, particularly preferably in the frequency range of 1 Hz to 500 Hz. The setting of the oscillation frequency is effected via the control unit which regulates or controls the valves 18, 19.

The required energy is fed via the flow and the treatment/retention time is defined by the interacting with the volume 16 of the reactor 1 (reactor volume, reactor length and reactor size), in particular of the process space 9 of the reactor 1. The retention time of the at least one starting material which is brought into the reactor 1, in particular into the process space of the reactor 1, in the treatment zone of the reactor 1 is between 0.1 s and 25 s.

Figure 3:
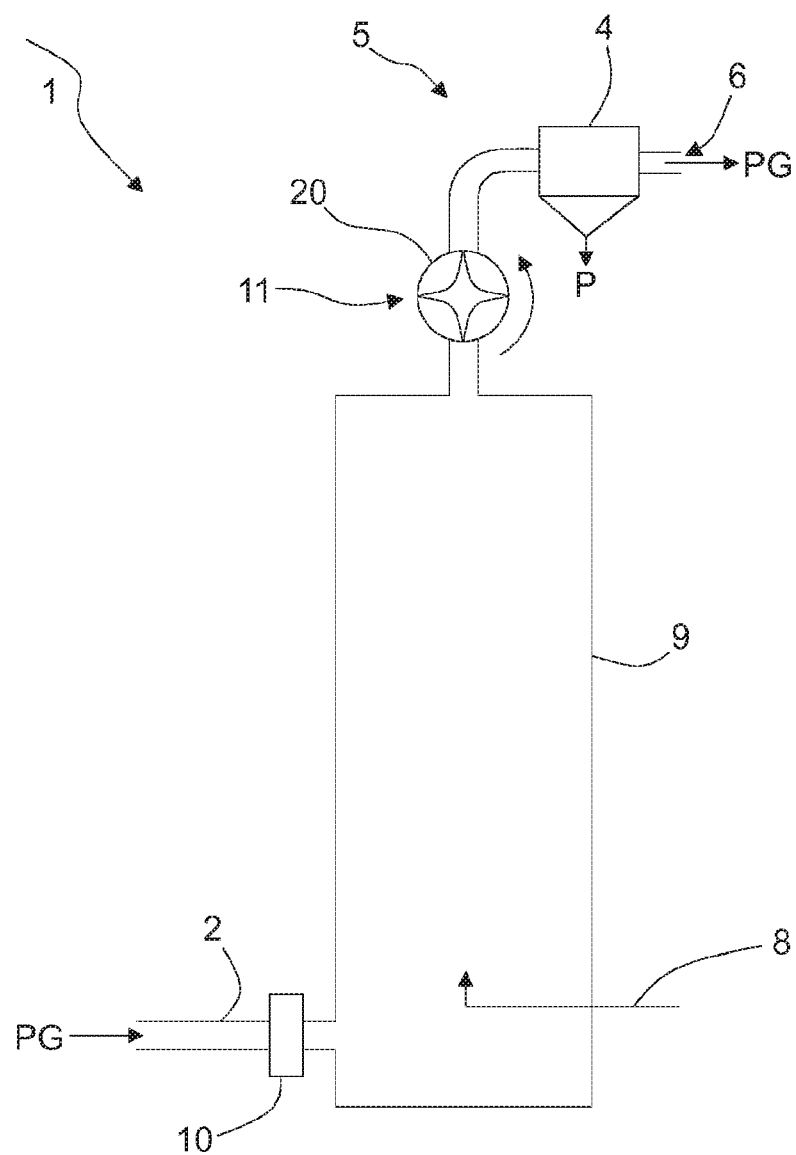

A schematic representation of a third embodiment of a reactor 1 according to the invention for manufacturing particles, in particular nanoparticles, is represented in FIG. 3. The reactor 1 comprises an inlet 2 as well as an outlet 5, both preferably designed as a pipe or pipe spout. The process gas which flows through the reactor 1 enters into the reactor 1 via the inlet 2 and exits from the reactor 1 via the outlet 5.

The inlet 2 comprises a heating unit 10, in particular a heating unit 10 which indirectly warms or heats the process gas which flows through the reactor 1, preferably an electric gas heater, a plasma heating, a microwave heating, an induction heating, a radiation heater or the like. Depending on the demands on the purity of the process gas, heating surfaces of the heating unit 10 are designed in a gas-contacting or contact-free manner.

Preferably, the heating unit 10 warms or heats the process gas which flows through the reactor 1 to a treatment temperature of 100° C. to 3000° C., wherein the retention time of the at least one starting material which is brought into the reactor 1, in particular into the process space of the reactor 1, in the treatment zone of the reactor 1 is between 0.1 s and 25 s. The at least one starting material (AGS) which is brought into the reactor 1 via the inlet 8 is thermally treated in a treatment zone of the reactor 1. The treatment zone is preferably limited to a process space 9 of the reactor 1.

The outlet 5 comprises a separating unit 4, in particular a filter, preferably a hot gas filter, very particularly preferably a bag filter or glass fibre filter, a cyclone or wet scrubber. The separating unit 4 separates the thermally treated particles out of the process gas stream. The particles which are separated out of the process gas stream are led away out of the separating unit 4. The process gas which is not loaded is led away into the surroundings via the outlet opening 6 of the outlet 5.

Figure 4:
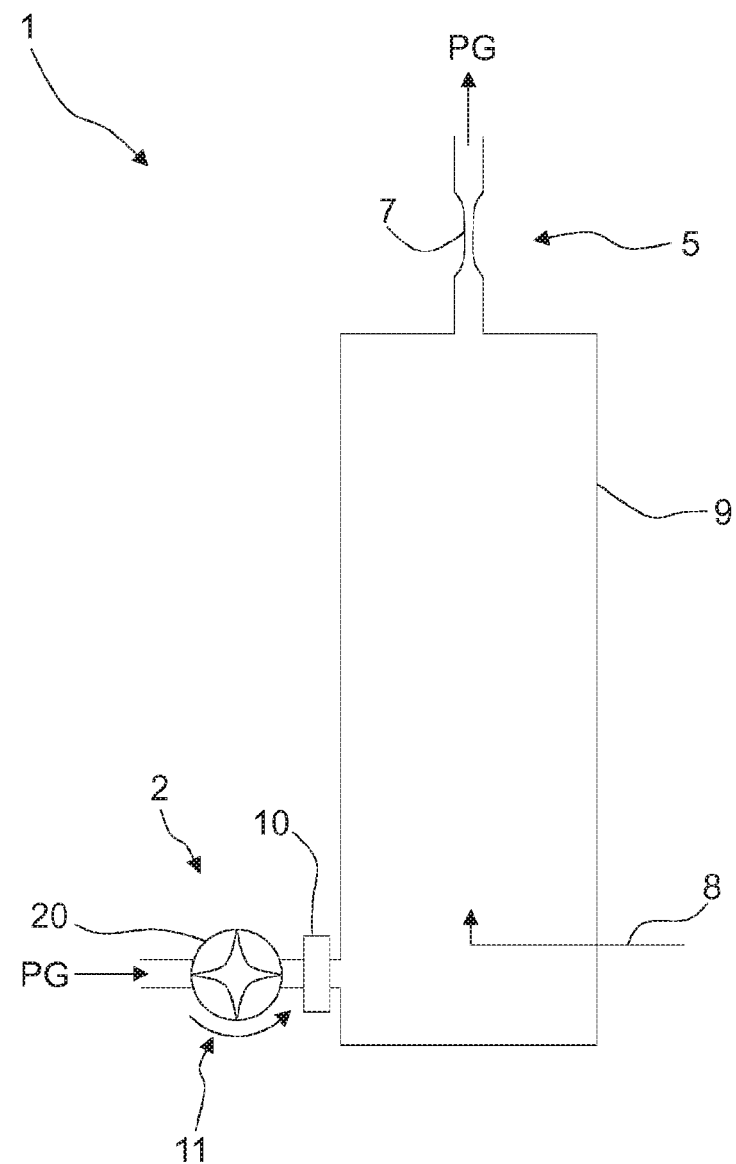

The reactor 1 comprises a pulsation unit 11 for the amplitude and/or pressure modulation of the process gas (PG) which flows through the reactor 1. A pulsation is modulated or imparted to the process gas which flows through the reactor 1, by way of the pulsation unit 11. The pressure pulsation preferably has a pressure amplitude of 1 mbar to 350 mbar, particularly preferably of 1 mbar to 200 mbar, very particularly preferably of 3 mbar to 50 mbar, mostly preferably of 3 mbar to 25 mbar. On account of the heating unit 10 and the pulsation unit 11, a pulsating hot process gas stream flows through the reactor 1. The amplitude modulation can be effected independently of the frequency modulation. In FIG. 3, the pulsation unit 11 is realised by a rotary slide valve 20. Additionally, the process gas which flows into the reactor 1 has an increased preliminary pressure in the embodiment of the reactor 1 according to the invention. The process gas stream which is at a preliminary pressure and which enters the reactor 1 at the inlet side is interrupted or released by way of the rotary slide valve 20, so that the process gas enters into the reactor 1 in a cycled manner. By way of this, a pulsation of the process gas which flows through the reactor 1 is effected. A pulsation oscillation is modulated onto the process gas stream. The oscillation frequency of the process gas which flows through the reactor 1 in a pulsating manner on account of the pulsation unit 11 can likewise be set, preferably in the frequency range of 1 Hz to 2000 Hz, particularly preferably in the frequency range of 1 Hz to 500 Hz. FIG. 4 shows a schematic representation of a fourth embodiment of the reactor 1 according to the invention, for manufacturing particles, preferably organic or inorganic nanoparticles, very particularly preferred nano-crystalline metal oxide particles. The reactor 1 comprises an inlet 2, preferably designed as a pipe or pipe spout, and an outlet 5, likewise preferably designed as a pipe or pipe spout. The process gas, preferably an inert gas, an explosion protection gas or a gas which is suitable for deoxidising operation enters the reactor 1 through an inlet opening of the inlet 2. In the fourth embodiment of the reactor according to the invention which is shown in FIG. 4, the inlet 2 comprises a heating unit 10 and a pulsation unit 11. The heating unit 10 is herein arranged downstream of the pulsation unit 11. The heating unit 10 heats or warms the process gas which flows into the reactor 1 via the inlet opening of the inlet 2 and subsequently through the reactor 1 to the treatment temperature. Preferably, the heating unit heats or warms the process gas which flows through the reactor 1 to a treatment temperature of 100° C. to 3000° C., particularly preferably to a temperature between 650° C. to 2200° C., very particularly preferably to a temperature between 700° C. and 1800° C. The heating unit 10 can provide the thermal energy, which is necessary for the warming or heating, to the process gas which flows through the reactor 1, by way of direct or indirect heating. The heating unit 10 is herein for example a direct burner, i.e. a direct contact exists between the process gas and a burner flame. Furthermore, the heating unit 10 can be designed as an indirect heating unit in the form of an electric gas heater, a plasma heating, a microwave heating, an induction heating, a radiation heater, or an indirect burner. Depending on the purity demands on the process gas which flows through the reactor 1, the heating surfaces can be designed in a gas-contacting or contact-free manner. Preferably, an indirect heating is applied, since by way of such the reactor is compatible for the pharmaceutics and foodstuff industry.

Furthermore, the reactor 1 comprises a pulsation unit 11 for the pressure modulation of the process gas which flows through the reactor 1, by which means a pulsation is modulated onto the process gas which flows through the reactor 1. The pressure pulsation preferably has a pressure amplitude of 1 mbar to 350 mbar, in particular preferably of 1 mbar to 200 mbar, very particularly preferably of 3 mbar to 50 mbar, and mostly preferably of 3 mbar to 25 mbar. A pulsating hot process gas stream flows through the reactor 1 on account of the heating unit 10 and pulsation unit 11. The oscillation frequency of the process gas can be set independently of the pressure amplitude. The oscillation frequency of the process gas which flows through the reactor 1 in a pulsating manner on account of the pulsation unit 11 can likewise be set, preferably in the frequency range of 1 Hz to 2000 Hz, particularly preferably in the frequency range of 1 Hz to 500 Hz. In FIG. 4, the pulsation unit 11 is realised by a rotary slide valve 20 as already described in FIG. 3. In the embodiment of the reactor according to the invention and according to FIG. 4, the process gas which flows into the reactor 1 also has an increased preliminary pressure. The process gas stream which enters into the reactor 1 at the inlet side and which is at a preliminary pressure is interrupted or released by the rotary slide valve 20, so that process gas enters the reactor 1 in a cycled manner. A pulsation of the process gas which flows through the reactor 1 is effected by way of this. A pulsation oscillation is modulated onto the process gas stream.

The reactor 1 furthermore comprises a process space 9 which connects onto the inlet 2 downstream. The at least one starting material (AGS) is brought into the pulsatingly flowing hot process gas stream in the process space 9 of the reactor 1. An inlet 8 which is preferably designed as a feed unit, particularly preferably as a single-substance and/or multi-substance nozzle and/or as a powder injector serves for bringing the at least one starting material (AGS) into the reactor 1. The at least one starting material (AGS) can be brought into the reactor 1 in the flow direction or counter to the flow direction of the pulsating hot process gas. In the shown embodiment of the reactor 1, the at least one starting material (AGS) is introduced in the flow direction of the process gas.

Furthermore, the reactor 1 comprises an outlet 5. The outlet 5 is preferably designed as a pipe or pipe spout. In the embodiment of the reactor 1 according to the invention, which is shown in FIG. 4, the outlet 5 comprises an installation part 7. The installation part 7 is designed in the form of a necking of the outlet 5. The installation part 7 restricts the pressure pulsation to the process space 9 of the reactor 1. A separating unit 4 which is not represented here is arranged in the outlet 5 downstream of the installation part 7.

Figure 5:
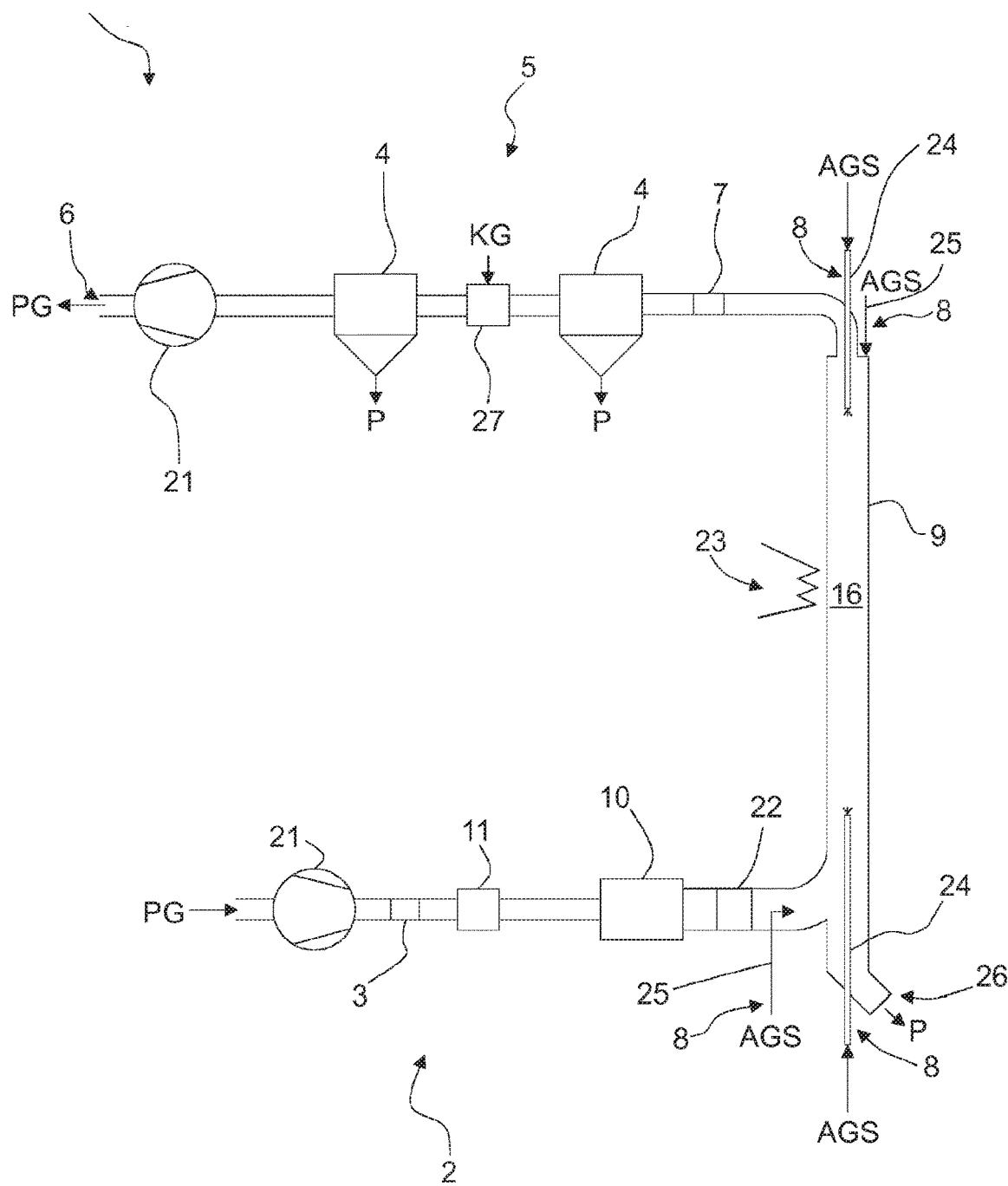

FIG. 5 represents a detailed schematic representation of a fifth embodiment of a reactor 1 according to the invention, said reactor being suitable for the manufacture of particles, preferably for the manufacture of inorganic or organic nanoparticles, particularly preferably nano-crystalline metal oxide particles. The reactor 1 comprises an inlet 2 which comprises an inlet opening. The process gas (PG) enters the reactor 1 via the inlet opening of the inlet 2. Ambient air, nitrogen or other special gases can be used as a process gas. The process gas can be fed to the reactor 1 in an unfiltered, filtered and/or conditioned manner via the inlet 2

Furthermore, the inlet 2 comprises a flow machine 21 which can be designed for example as a radial fan, blower, or compressor. Additionally, the inlet 2 comprises a pulsation unit 11, preferably a rotary slide valve or a rotating flap which is used for the pressure modulation of the process gas (PG) which flows through the reactor 1. By way of this, a pulsation is modulated onto the process gas which flows through the reactor 1, so that a pulsating process gas stream flows through the reactor 1 on account of the pulsation unit 11. The pressure pulsation preferably has a pressure amplitude of 1 mbar to 350 mbar, particularly preferably of 1 mbar to 200 mbar, very particularly preferably of 3 mbar to 200 mbar, most preferred of 3 mbar to 25 mbar. The oscillation frequency of the process gas can be set independently of the pressure amplitude. The oscillation frequency of the process gas which flows through the reactor 1 in a pulsating manner on account of the pulsation unit 11 can likewise be set, preferably in the frequency range of 1 Hz to 2000 Hz, particularly preferably in the frequency region of 1 Hz to 500 Hz. The pressure pulsation is "forcibly excited", i.e. the pressure pulsation is not a result of complex flow procedures in part-assemblies, for example in the combustion chamber. This has the advantage of being able to have method-technological parameters or setting variables which are independent of one another and being able to set arbitrary combinations. A process gas stream which is settable in its parameters (amplitude, frequency, speed etc.) is necessary for as long as and only where the particles are essentially formed or treated. It is not absolutely necessary and also not always useful for the complete facility volume 16 to be subjected to pulsating throughflow.

Furthermore, the inlet 2 of the reactor 1 comprises a heating unit 10 which heats or warms the process gas which flows through the reactor to the treatment temperature. The treatment temperature herein lies between 100° C. and 3000° C. It is particularly electric gas heaters, plasma beatings, microwave heating, induction heating and radiation heaters which are suitable as a heating unit 10. There exists the possibility of heating or warming the process gas in an indirect or direct manner via the heating unit 10. For example, one can also use a burner which is arranged in a combustion chamber, for the direct heating of the process gas. Depending on the demands on the purity of the process gas, which is necessary for the process, the heating surfaces of the heating unit 10 can be designed in a gas-contacting or contact-free manner. The process gas is preferably indirectly heated. The retention time of the at least one starting material which is brought into the reactor 1, in particular into the process space 9 of the reactor 1, in the treatment zone of the reactor 1 is between 0.1 s and 25 s.

In the fifth embodiment of the reactor 1 according to the invention, an installation part 3 is installed in the inlet 2 between the flow machine 21 and the pulsation unit 11. The installation part 3 is preferably designed in the form of a necking of the inlet 2 which is designed for example as a pipe or pipe spout, or in the form of a throttle, preferably of a pressure-resistant throttle.

A heat reservoir 22 is additionally installed in the reactor 1 subsequently to the heating unit 10. Preferably, the heat reservoir 22 is designed as a porous medium, for example as a sponge or filling or the like. Particularly preferably, installation parts with a high thermal capacity are used as a heat reservoir. The heat reservoir 22 has the function of effecting a damping or a compensation of temperature fluctuations on account of pulsating flows in the heating unit 10. A minimal pressure loss occurs given an arrangement of the heat reservoir 22 downstream of the pulsation unit 11.

In particular, the reactor 1 comprises a process space 9. The process space 9 predominantly serves as a treatment zone of the particles to be manufactured or treated. The reactor 1, preferably the process space 9 comprises a further heating unit 23. It is possible to heat the process space 9, preferably the process space or reactor wall in a direct or indirect manner via the further heating unit 23. The further heating unit 23 is preferably designed as a trace heating, plasma heating, microwave heating, induction heating, radiation heater or as a burner.

Advantageously, the treatment temperature of the process gas which flows through the reactor 1 can be adapted and/or readjusted by way of the further heating unit 23, for the production or the thermal treatment of the particles. By way of this, it is ensured that an optimal treatment temperature in the treatment zone of the reactor 1, in particular in the process space 9 of the reactor 1 is set in the reactor 1 at each time of the manufacturing method. Furthermore, the reactor 1 comprises at least one inlet 8 for bringing at least one starting material into the reactor 1, preferably into the process space 9 of the reactor 1. In the embodiment of the reactor 1 according to the invention, which is shown in FIG. 5, by way of example different inlets 8 for example for bringing liquids or solid materials into the reactor 1, preferably into the process space 9 of the reactor 1, are shown. Liquids or fluid raw materials (precursors) can be brought into the reactor 1, preferably into the process space 9 of the reactor 1, preferably as a solution, suspension, molten mass, emulsion or as a pure liquid. The bringing of the fluid raw materials or liquids is preferably effected in a continuous manner. Preferably a feed unit 24, such as for example spray nozzles, feed pipes or droplet generators which are designed for example as single-substance nozzles or multi-substance nozzles, pressure nozzles, nebulisers (aerosol) or ultrasound nozzles are used for bringing liquids into the reactor 1. In contrast to this, preferably a feed unit 25 such as for example a double flap, a rotary feeder, a double flap batching valve or an injector is used for bringing solid materials, for example powder, granulates or the like, into the reactor 1, preferably into the process space 9 of the reactor 1. The introduction of the at least one starting material (AGS) in the form of a liquid or a solid material can be effected in or counter to the flow direction of the process gas which flows through the reactor 1. Preferably, the at least one starting material (AGS) is brought into the reactor 1, preferably into the process space 9 of the reactor amid the use of a carrier gas. The decision as to whether the at least one starting material (AGS) is brought into the reactor in or counter to the flow direction of the process gas depends predominantly on the shape, mass and density of the at least one starting material, given a set average flow speed of the process gas.

The thermal synthesis or the thermal treatment represents the actual technical method step for manufacturing or treating the at least one starting material into particles. Hereby, precisely controlled, and reproducible process conditions are to be set in the process space 9 (reaction space).

The reactor 1, in particular the process space 9 of the reactor 1 furthermore comprises an outlet 26 for a starting material which is brought into the reactor 1 and which on account of its shape, mass and density, given the set average flow speed of the process gas which flows through the reactor 1, cannot be transported by the process gas. Given the thermal treatment of starting materials which cannot be transported by the process gas, the reactor 1, preferably the process space 9 of the reactor 1, particularly preferably the treatment zone of the reactor 1 must stand perpendicularly, so that the at least one starting material which is to be treated thermally sinks downwards in the direction of the outlet 26 which is arranged at the lower end of the reactor 1, on account of gravity. The thermally treated particles (P) can be brought out of the reactor 1 at the outlet 26 via a lock system which is not shown.

Furthermore, the reactor 1 comprises an outlet 5. In the fifth embodiment of the reactor 1 according to the invention, which is represented in FIG. 5, the outlet 5 in the flow direction of the process gas which flows through the reactor 1 comprises an installation part 7, a first separating unit 4, a quenching unit 27, a second separating unit 4 and a flow machine 28.

The installation part 7 is preferably designed in the form of a necking of the outlet 5 which is designed for example as a pipe or pipe spout or in the form of a throttle, preferably a pressure-resistant throttle.

The installation parts 3, 7 are preferably used for restricting the pressure pulsation to the process space 9 of the reactor 1. The separating unit 4 which is first in the flow direction of the process gas (PG) which flows through the reactor 1 is preferably designed as a cyclone or filter, in particular hot-gas filter, preferably as a bag filter, metal filter or glass fibre filter. The first separating unit 4 is particularly preferably used for the dry separation of the manufactured or thermally treated particles (P).

The quenching unit 27 is used in order to stop the reaction which takes its course in the reactor 1, at a certain point in time. For this, a cooling gas (KG), preferably air, particularly preferably cold air or pressurised air is admixed via the quenching unit 27 to the hot process gas stream which pulsatingly flows through the reactor 1. Other gases, such as e.g. nitrogen ($N_2$), Argon (Ar), other inert or noble gases or the like can just as well be used as a cooling gas. The cooling gas which is admixed via the quenching unit 27 can possibly be filtered or conditioned prior to this depending on the demands. Furthermore, it is possible to carry out a water injection alternatively to the admixing of the air. The quenching unit 27 can comprise fittings or is installed in the reactor 1 without fittings.

In the fifth embodiment of the reactor 1 according to the invention, which is shown in FIG. 5, a second separating unit 4 is installed downstream of the quenching unit 27. The second separating unit 4 preferably likewise serves for the dry separation and is preferably designed as a filter, in particular as a hot gas filter, as a cyclone or as a wet scrubber. The particles which are possibly not separated from the process gas which flows through the reactor 1 via the first separating unit 4 are separated from the process gas via the second separating unit 4.

A further flow machine 21, preferably a radial fan, a blower or a compressor is arranged in the reactor 1 in front of the outlet opening 6 of the outlet 5. The further flow machine 21 can be installed in the reactor 1 additionally or alternatively to the flow machine 21 which is arranged in the inlet 2.

Figure 6:
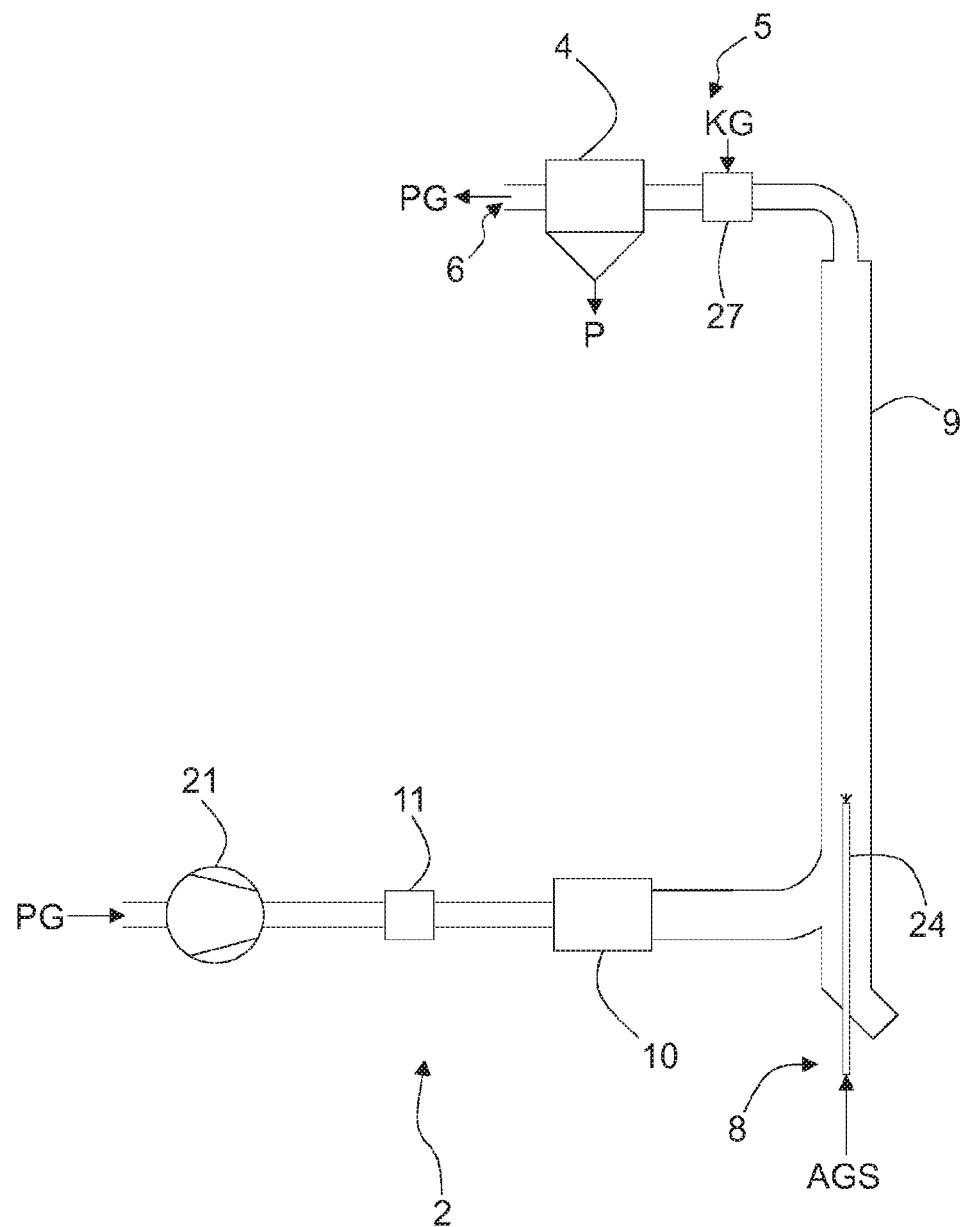

A detailed schematic representation of a sixth embodiment of the reactor 1 according to the invention for manufacturing particles, in particular inorganic or organic particles, preferably nano-crystalline metal oxide particles, is represented in FIG. 6.

The reactor 1 comprises an inlet 2 comprising a flow machine 21, a pulsation unit 11 and a heating unit 10. The process gas which flows through the reactor 1 enters the reactor 1 via the inlet 2. Hereby, a pressure pulsation is modulated onto the process gas which flows through the reactor 1, by way of a pulsation unit 11.

The pressure pulsation preferably has a pressure amplitude of 1 mbar to 350 mbar, particularly preferably of 1 mbar to 200 mbar, very particularly preferably of 3 mbar to 50 mbar and most preferably of 3 mbar to 25 mbar. The oscillation frequency of the process gas can be set independently of the pressure amplitude. The oscillation frequency of the process gas which flows through the reactor 1 in a pulsating manner on account of the pulsation unit 11 can likewise be set, preferably in the frequency range of 1 Hz to 2000 Hz, particularly preferably in the frequency range of 1 Hz to 500 Hz. The pulsating process gas stream which flows through the reactor 1 is subsequently warmed or heated to the treatment temperature by the heating unit. The treatment temperature for the manufacture or thermal treatment of the at least one starting material is preferably between 100° C. and 3000° C., preferably between 650° C. and 2200° C., particularly preferably between 700° C. and 1800° C.

The process space 9 of the reactor 1 is formed downstream of the reactor 1. The at least one starting material is brought into the pulsating gas stream which flows through the reactor 1, in the process space 9 of the reactor 1. An inlet 8 is provided in the reactor 1, preferably in the process space 9 of the reactor 1, for bringing the at least one starting material (AGS) into the reactor 1, said inlet preferably being designed as a feed unit, particularly preferably as a single-substance nozzle and/or multi-substance nozzle and/or as an injector. In the embodiment of the reactor 1 according to the invention, shown in FIG. 6, the at least one starting material (AGS) is fed in the flow direction of the pulsatingly flowing hot process gas.

The at least one starting material (AGS) is thermally treated in the treatment zone of the reactor 1, preferably in the process space 9 of the reactor 1, so that the particles to be manufactured, preferably the inorganic or organic nanoparticles, particularly preferably the nano-crystalline metal dioxide particles form.

Furthermore, the reactor 1 for manufacturing particles comprises an outlet 5. In the sixth embodiment of the reactor 1 according to the invention, shown in FIG. 6, the outlet 5 comprises a quenching unit 27 and a separating unit 4 in the flow direction of the pulsatingly flowing hot process gas.

The quenching unit 27 is used in order to stop the reaction which takes its course in the reactor 1, at a defined point in time. For this, a cooling gas, preferably air, particularly preferably cold air or pressurised air is admixed to the hot process gas stream which pulsatingly flows through the reactor 1, via the quenching unit 27. The air which is admixed via the quenching unit 27 can possibly filtered or conditioned prior to this depending on the demands. Furthermore, it is possible to carry out a water injection as an alternative to the air admixture. The quenching unit 27 which is arranged in the reactor 1 can comprise fittings or is installed in the reactor 1 without fittings. Other gases, such as e.g. nitrogen ($N_2$), argon (Ar), other inert gases or noble gases or the like can also be applied as a cooling gas.

The separating unit 4, in particular a filter, preferably a hot gas filter, very particularly preferably a bag filter, metal filter or glass fibre filter, a cyclone or a wet scrubber separates the thermally treated particles from the hot process gas stream which flows through the reactor 1 in a pulsating manner. The particles which are separated out of the process gas stream are led away out of the separating unit 4 and are processed further. If necessary, the particles which are thermally treated in the reactor 1 according to the invention are subjected to further post-treatment steps, such as for example a suspending, grinding or calcination. The process gas which is not loaded is led away into the surroundings via the outlet opening 6 of the outlet 5.

The retention time of the at least one starting material which is brought into the reactor 1, in particular into the process space of the reactor 1, in the treatment zone of the reactor 1 is between 0.1 s and 25 s.

With regard to all aforementioned reactors 1 according to the invention, shown in FIGS. 1 to 6, a circulating manner of the process gas (PG) is possible. A part-out-circulation of the process gas is also possible as the case may be. In comparison to the burner system according to the state of the art, significantly lower process temperatures are possible in a very economical manner, i.e. without additional air feed.

The invention claimed is:

1. A method for manufacturing particles comprising the steps:
   (a) bringing at least one starting material into a reactor;
   (b) subjecting the at least one starting material to a thermal treatment of a pulsating process gas stream in a treatment zone of the reactor;
   (c) forming particles; and
   (d) bringing the particles which are obtained in steps (b) and (c) out of the reactor,
   wherein the temperature regulation of the process gas stream is decoupled from the generation and maintenance of the pulsation of the process gas stream,
   wherein the at least one starting material is thermally treated in the treatment zone at a treatment temperature of 100° C. to 3000° C. and a retention time in the range of 0.1 s to 25 s,
   and
   wherein the pulsation is confined to a process space by at least an installation part which is designed as a flow necking or as a throttle arranged upstream and/or downstream of the process space and adjacent thereto.

2. The method according to claim 1, wherein the process gas is an inert gas, an explosion protection gas, a gas mixture, or a gas which is suitable for deoxidising operation.

3. The method according to claim 1, wherein the at least one starting material is fed into a process space of the reactor.

4. The method according to claim 1, wherein the at least one starting material is brought into the reactor in or counter to the flow direction of the pulsating process gas stream.

5. The method according to claim 1, wherein the process gas which flows through the reactor in a pulsating manner is heated to the treatment temperature upstream of a pulsation unit.

6. The method according to claim 1, wherein the at least one starting material is thermally treated in the treatment zone at a treatment temperature of 650° C. to 2200° C. with a retention time of 0.1 s to 25 s.

7. The method according to claim 1, wherein the at least one starting material is thermally treated in the treatment zone at a treatment temperature of 100° C. to 3000° C. with a retention time of 2.1 s to 25 s.

8. The method according to claim 1, wherein the process gas is pulsed at a frequency of 1 Hz to 2000 Hz.

9. The method according to claim 1, wherein a pressure pulsation with a pressure amplitude of 1 mbar to 350 mbar is modulated onto the process gas which flows through the reactor.

10. The method according to claim 1, wherein the method occurs at a negative pressure with respect to the ambient pressure.

11. The method according to claim 1, wherein the reactor which is used for the method is a reactor for manufacturing particles, comprising:
    (a) an inlet for bringing at least one starting material into the reactor;
    (b) an inlet for a process gas which flows through the reactor;
    (c) a heating unit for heating the process gas which flows through the reactor to a treatment temperature;
    (d) a pulsation unit for pressure modulation of the process gas which flows through the reactor; and
    (e) a separating unit for bringing the particles out of the reactor,
    wherein the heating unit and the pulsation unit are spatially separated from one another.

* * * * *